United States Patent
Pandey et al.

(10) Patent No.: US 11,729,598 B2
(45) Date of Patent: *Aug. 15, 2023

(54) CELLULAR-BASED ALERTS IN DISTRIBUTED APPLICATIONS

(71) Applicant: T-Mobile USA, Inc., Bellevue, WA (US)

(72) Inventors: Sudhanshu Pandey, Sammamish, WA (US); Raghavendra Kulkarni, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,902

(22) Filed: Mar. 18, 2022

(65) Prior Publication Data

US 2022/0210629 A1   Jun. 30, 2022

Related U.S. Application Data

(63) Continuation of application No. 16/999,998, filed on Aug. 21, 2020, now Pat. No. 11,317,270.

(51) Int. Cl.
*H04W 4/90* (2018.01)
*G08B 27/00* (2006.01)

(52) U.S. Cl.
CPC ............ *H04W 4/90* (2018.02); *G08B 27/005* (2013.01); *G08B 27/006* (2013.01)

(58) Field of Classification Search
CPC ....................................................... H04W 4/90
See application file for complete search history.

(56) References Cited

U.S. PATENT DOCUMENTS

| | | | | |
|---|---|---|---|---|
| 11,317,270 | B2* | 4/2022 | Pandey | G08B 27/005 |
| 2014/0141806 | A1* | 5/2014 | Phulari | H04W 4/90 |
| | | | | 455/456.3 |
| 2014/0357216 | A1* | 12/2014 | Armitage | H04W 4/90 |
| | | | | 455/404.2 |

(Continued)

OTHER PUBLICATIONS

Notice of Allowance dated Dec. 27, 2021 for U.S. Appl. No. 16/999,998 (pp. 1-8).

*Primary Examiner* — Travis R Hunnings
(74) *Attorney, Agent, or Firm* — Loeb & Loeb LLP

(57) ABSTRACT

Systems and methods present practical applications to directing emergency alerts from cellular-based message distribution systems to distributed desktop applications via a desktop application gateway. Logic in the desktop applications and their corresponding IP network gateways for the desktop application may direct alerts from the cellular-based system to distributed desktop applications having a connection to the gateway. A distributed application may determine a location of the user and include enhancements to display the alert at a user's computing device. The gateway for the distributed application may store the location information for each logged-in user or registered instance of the user. An interface between the cell broadcast center and the distributed application gateway may allow the gateway to receive the alert, including a region for distributing the alert, from the cell broadcast center, and send the alert to all registered users with a location matching the alert region.

20 Claims, 2 Drawing Sheets

(56) References Cited

U.S. PATENT DOCUMENTS

| | | | |
|---|---|---|---|
| 2019/0297453 A1* | 9/2019 | Guegel | H04W 4/06 |
| 2020/0160691 A1* | 5/2020 | Allen | H04W 4/33 |
| 2021/0136531 A1* | 5/2021 | Dorian | H04W 4/90 |
| 2022/0060875 A1 | 2/2022 | Pandey | |

* cited by examiner

CELLULAR-BASED ALERTS IN DISTRIBUTED APPLICATIONS

CROSS-REFERENCE TO RELATED APPLICATION

This application is a continuation of U.S. patent application Ser. No. 16/999,998, filed on Aug. 21, 2020, the entire contents of which are expressly incorporated by reference herein.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

The Federal Emergency Management Agency (FEMA) issues alerts for various public emergencies (e.g., child abduction, weather emergencies, etc.) through the Integrated Public Alert and Warning System (IPAWS). FEMA IPAWS works with mobile network operators (MNO) to broadcast alerts in a specific region over the radio elements to their subscribers' mobile devices. However, IPAWS is not configured to also relay these alerts to desktop applications. If a subscriber is not paying attention to their user equipment (UE) that is subscribed to an MNO, the UE is not connected to the MNO radio elements, or various other reasons, then the alert will go unnoticed. In a typical scenario, a subscriber may be working with a desktop application away from their phone or other UE. If FEMA issued an IPAWS alert, it would not be received by the subscriber in a timely manner. A system to integrate IPAWS and FEMA alerts into desktop applications is needed.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

To solve the technical problem described above, logic in desktop applications and an IP network gateway for the desktop application may direct FEMA alerts from IPAWS to desktop applications having a connection to the gateway. A distributed application (e.g., DIGITS™, BusinessHub™ Connect, Zoom®, Skype®, etc.) with a real-time communication capability may determine a location of the user and include enhancements to display the alert by FEMA standards. The gateway for the distributed application may store the location information for each logged-in user or registered instance of the user. An interface between the MNO's cell broadcast center and the distributed application gateway may allow the gateway to receive the alert, including a region for distributing the alert, from the cell broadcast center. The gateway may then send the alert to all registered users with a location matching the alert region. The distributed application may then display the alert within an application graphical user interface of the distributed application for all users within the alert region.

In further embodiments, an apparatus may broadcast an alert message from a cell broadcast center to a network for display within a desktop application executing over the network. A desktop application executing on a plurality of computing devices over the network may include a first processor and a first memory storing instructions for execution by the first processor. For example, the instructions of the first memory may include instructions for determining a location for each of the plurality of computing devices executing an instance of the desktop application, and publishing the location for each of the plurality of computing devices executing an instance of the desktop application to a register corresponding to the instance. A gateway to the network for the desktop application may include a second processor and a second memory storing instructions for execution by the second processor. These instructions may be for receiving the location information for each of the plurality of computing devices executing an instance of the desktop application and receiving the alert message from the cell broadcast center. The alert message includes a region. Further instructions may then broadcast the alert message to each computing device including location information that matches the region.

In still further embodiments, a computer-implemented method may broadcast an alert message from a cell broadcast center to a network for display within a desktop application executing over the network. For example, the method may determine a location for each of the plurality of computing devices executing an instance of the desktop application, and publish the location for each of the plurality of computing devices executing an instance of the desktop application to a register corresponding to the instance. The method may then receive the location information for each of the plurality of computing devices executing an instance of the desktop application, and receive the alert message from the cell broadcast center. The alert message includes a region. The method may then broadcast the alert message to each of the plurality of computing devices including location information that matches the region.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

The present application describes embodiments including various elements that are present in a device testing environment such as control signals, modules, blocks, functions, data structures, etc. These elements are not an exhaustive collection of all elements needed to perform the functions of a testing environment (i.e., a platform or computer-executable method for automating test scripting and creating multiple environments to run software and device tests) or the disclosed embodiments. Indeed, the elements associated with the systems and methods described in this application are only some of the possible elements that are needed to implement the embodiments. Some embodiments may include more or fewer elements than those that are described with the embodiments, as known by a person having ordinary skill in the art of mobile telecommunications systems.

The disclosure presents practical applications to directing FEMA or other alerts from cellular-based message distribution systems (e.g., IPAWS) to distributed desktop applications via a particularly-configured desktop application gateway. Logic in the desktop applications and their corresponding IP network gateways for the desktop application may direct FEMA and other alerts from the cellular-based system to distributed desktop applications having a connection to the gateway. A distributed application (e.g., DIGITS™, BusinessHub™ Connect, Zoom®, Skype®, etc.) with a real-time communication capability may determine a location of the user and include enhancements to display the alert by FEMA standards. The gateway for the distributed application may store the location information for each logged-in user or registered instance of the user. An interface between the MNO's cell broadcast center and the distributed application gateway may allow the gateway to receive the alert, including a region for distributing the alert, from the cell broadcast center. The gateway may then send the alert to all registered users with a location matching the alert region. The distributed application may then display the alert within an application graphical user interface of the distributed application for all users within the alert region.

Figure 1:
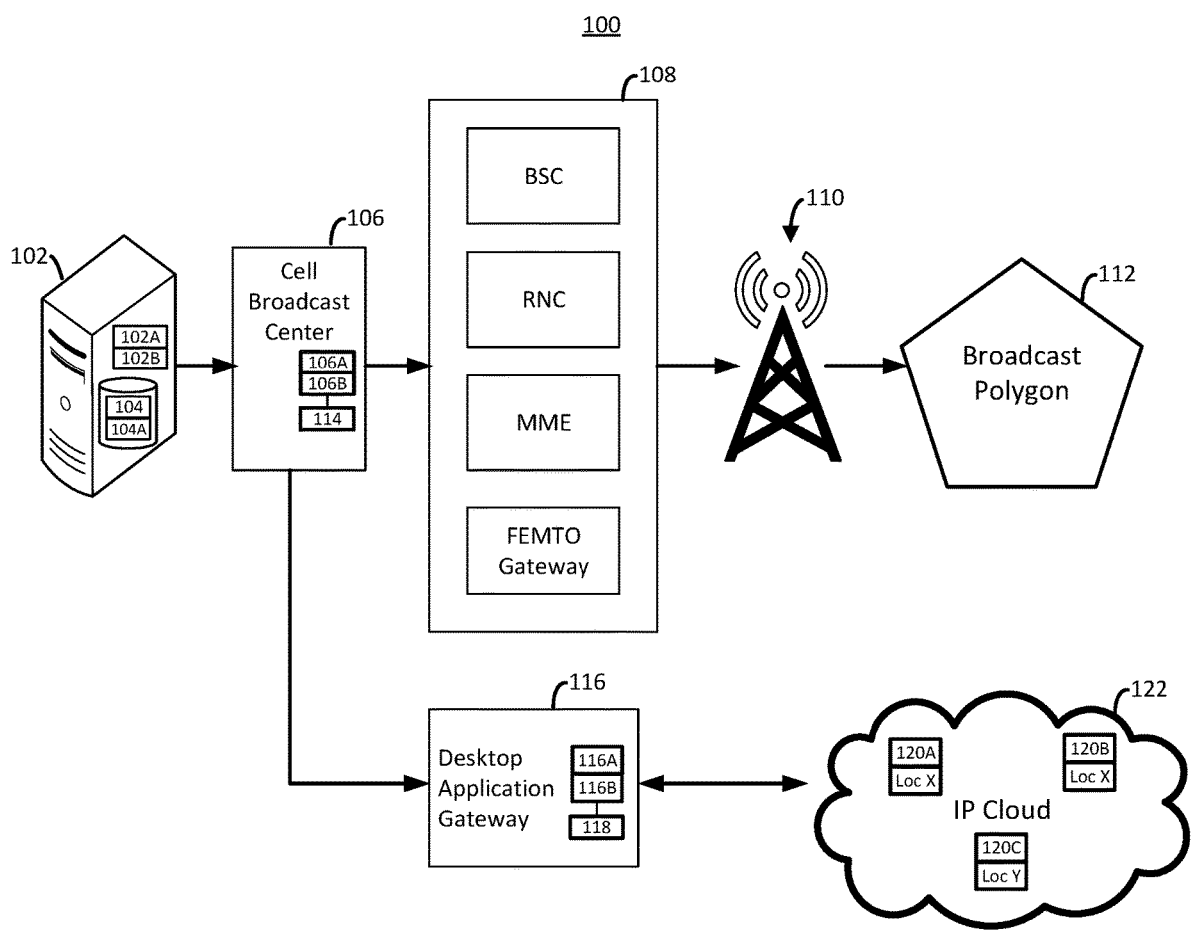
FIG. 1 is an illustration of an first exemplary system for displaying cellular-based alerts in distributed application.

FIG. 1 generally illustrates one embodiment of a desktop alert messaging system 100 that implements the technical solution to the technical problem of displaying cellular-based alerts on desktop applications. In some embodiments, the system 100 may include a having a processor 102A and a memory 102B storing instructions for execution on the processor to implement at least some of the technical solutions described herein. For example, the cellular alert system 102 may include the integrated public alert and warning system (IPAWS) maintained by FEMA. In a typical cellular alert system 102, standards-based alert message protocols, authenticated alert message senders, and shared access and distribution networks may work together to deliver alerts and warnings to public interface devices such as mobile network operator user equipment (UE). For example, the cellular alert system 102 may send a wireless emergency alert 104 to various UE within a region corresponding to the alert. In some embodiments, the alert 104 is in a common alerting protocol (CAP). See "Common Alerting Protocol Version 1.2" available at https://docs.oasis-open.org/emergency/cap/v1.2/CAP-v1.2-os.pdf. The wireless emergency alert 104 may be in any format that allows a consistent warning message to be disseminated simultaneously over many different warning systems, thus increasing warning effectiveness while simplifying the warning task. The wireless emergency alert may also facilitate detecting emerging patterns in local warnings of various kinds, such as might indicate an undetected hazard or hostile act. Each wireless emergency alert 104 may include region information 104A indicating a geographical area for disseminating information of the wireless emergency alert 104.

The cellular alert system 102 generally and the memory 102B in particular may include instructions to receive the wireless emergency alert 104 and its corresponding region information 104A from a remote alerting authority. Typical alerting authorities include police departments, regional government executive branch offices, weather authorities, civil defense authorities, etc. See "Organizations with Alerting Authority Complete and In Process" available at https://www.fema.gov/media-library/assets/documents/117152.

The memory 102B may also include instructions to validate, format, and forward the wireless emergency alert 104 and its corresponding region information 104A to a cell broadcast center 106 corresponding to one or more mobile network operators (MNOs).

The cell broadcast center (CBC) 106 may include a processor 106A and a memory 106B including instructions for execution on the processor 106A for receiving the wireless emergency alert 104 from the cellular alert system 102, and processing and modifying the wireless emergency alert 104 for broadcast to the proper UEs within the broadcast polygon 112 via radio elements 110. In some embodiments, the architecture for the cell broadcast center 106 may be described in the 3GPP standard 23.041. See "Technical realization of Cell Broadcast Service (CBS)" available at https://portal.3gpp.org/desktopmodules/Specifications/SpecificationDetails.aspx?specifi cationId=748. The CBC may be connected to several components 108 to facilitate alert message delivery. For example, the CBC may employ various base station controllers (BSCs), radio network controllers (RNCs), mobile management entities (MMEs), FEMTO or "small cell" gateways, and public warning system-interworking functions (PWS-IWFs). The CBC may be connected to several cell broadcast entities and is responsible for managing wireless emergency alerts. For example, the memory 106A may include instructions for execution on the processor 106B for:

allocation of serial numbers for the alert;
  modifying or deleting alerts being held by other system components;
  initiating broadcast to the radio elements 110 by sending fixed length alert messages to BSC/RNC/eNodeB/NG-RAN nodes for each language provided by the cell, and where necessary padding the pages to a length of 82 octets (see 3GPP TS 23.038);
  determining the set of cells to which a wireless emergency alert 104 should be broadcast based on the region information 104A and indicating within a serial number for the alert 104 the geographical scope of each alert 104;
  determining the time at which a wireless emergency alert 104 should commence being broadcast;
  determining the time at which a wireless emergency alert 104 should cease being broadcast and subsequently instructing each BSC/RNC/eNodeB/NG-RAN node to cease broadcast of the CBS message;
  determining the period at which broadcast of the wireless emergency alert 104 should be repeated; and
  determining the cell broadcast channel in GSM, on which the wireless emergency alert 104 should be broadcast; and
  when CBC transmits emergency messages, allocation of an "emergency indication" of the wireless emergency alert 104 to differentiate it from normal CBC messages, including the "Cell ID/Service Area ID list", "warning type", "warning message". For example, if "warning type" is 'test', only UEs which are specially designed for testing purposes may display the test message.

The CBC 106 may also include an interface 114 with a desktop application gateway 114. The interface 114 may include a representational state transfer (RESTful) application programming interface (API) or other type of API (e.g., simple object access protocol (SOAP), etc.) that is configured to use hypertext transfer protocol (HTTP) requests to GET, PUT, POST, and DELETE data. The interface 114 may include instructions for execution on the processor 1068 for modifying a format or other characteristics of the wireless emergency alert 104 so that the alert 104 may be received (e.g., in HTTP REST protocol) and further processed by the desktop application gateway 116 generally and a desktop alert module 118 in particular so that the alert 104 may be displayed within an interface of a desktop application executing on the network 122.

The desktop application gateway 116 may include a processor 116A and a memory 1168 storing a desktop alert module 118 for execution by the processor 116A for passing the wireless emergency alert 104 to instances of a desktop application 120A, 1208, 120C that are registered with the gateway 116 and executing on a computing device within a cloud or other network 122 (e.g., the Internet) via a suitable communication protocol for distributed and/or cloud-based applications. In some embodiments, the protocol includes a WebSocket protocol or other type of communication protocol providing full-duplex communication channels over a single TCP connection.

The desktop application 120A, 1208, 120C may include instructions for execution on a user's computing device to determine a location of the computing device (e.g., Loc. X, Loc. Y, etc., as shown in FIG. 1). In some embodiments, the instructions to determine the location of the computing device may include a Dynamic Host Configuration Protocol (DHCPv4 and DHCPv6) Option for Civic Addresses Configuration Information as described at https://tools.ietf.org/html/rfc4776, the entire disclosure of which is incorporated by reference herein. In other embodiments, the instructions to determine location may include a GEOPRIV Presence Information Data Format Location Object (PIDF-LO) as described at https://tools.ietf.org/html/rfc5491, the entire disclosure of which is also incorporated by reference herein. The desktop applications 120A, 1208, 120C may include instructions to create a PIDF-LO object and to publish latitude and longitude information corresponding to the user computing device (e.g., Loc. X, Loc. Y, etc.) in one or more registers corresponding to the applications 120A, 1208, 120C or otherwise accessible by the desktop application gateway 116.

The desktop alert module 118 of the desktop application gateway 116 may include further processor-executable instructions store the location information for each registered instance of the desktop application 120A, 1208, 120C in the memory 1168. The desktop alert module may also include instructions to receive the wireless emergency alert 104 and corresponding region information 104A at the gateway 116 via the interface 114 and match the region information 104A to the user computing device location information (Loc. X, Loc Y). Further instructions of the desktop alert module 118 may send the wireless emergency alert 104 to each instance of the desktop application 120A, 1208, 120C having location information that matches the region information 104A of the wireless emergency alert 104. For example, with reference to FIG. 1, the wireless emergency alert 104 may include region information 104A corresponding to "Loc. X." In this case, execution of the instructions to send the wireless emergency alert 104 to each instance of the desktop application 120A, 1208, 120C having location information that matches the region information 104A of the wireless emergency alert 104 would result in the wireless emergency alert 104 being sent by the desktop application gateway 116 to instances 120A and 1208, but not 120C. Continuing with the example, further instructions of each instance of the desktop application 120A and 1208 receiving the wireless emergency alert 104 may display the alert 104 within a user interface of the desktop application. Concurrently or substantially concurrently with the desktop application gateway 116, the radio elements 110 may include instructions to broadcast the wireless emergency alert 104 to the broadcast polygon 112 matching the region information 104A.

Figure 2:
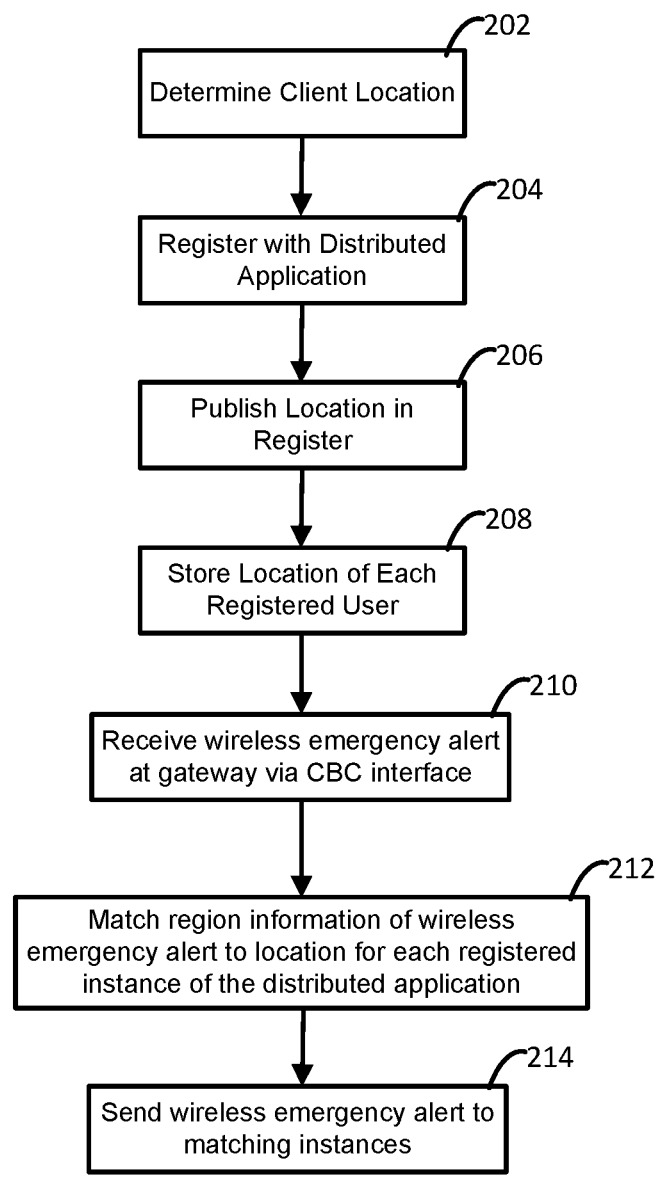
FIG. 2 is an illustration of a flow chart for a method of displaying cellular-based alerts in a distributed application.

FIG. 2 is a flowchart of a computer-implemented method 200 for completing one or more processes for displaying cellular-based alerts on desktop applications using the system of FIG. 1. Each step of the method 200 is one or more computer-executable instructions (e.g., control signals, modules, blocks, stand-alone instructions, etc.) performed on a processor of a server or other computing device shown in FIG. 1 (e.g., cellular alert system 102, cell broadcast center 106, system components 108, radio elements 110, desktop application gateway 116, desktop application instances 102A, 1028, 102C, etc.) which may be physically configured to execute the different aspects of the method. Each step may include execution of any of the processor-executable instructions as described in relation to the desktop alert messaging system 100 as part of the systems and modules described herein or other component that is internal or external to the system 100. While the below blocks are presented as an ordered set, the various steps described may be executed in any particular order to complete the methods described herein.

At block 202, the computer-implemented method 200 may initiate one or more processes for displaying cellular-based alerts on distributed desktop applications by determining a location of the client computing device for executing the desktop application (e.g., 120A, 120B, 120C of FIG. 1). In some embodiments, the method 200 may determine the location of the computing device via a Dynamic Host Configuration Protocol (DHCPv4 and DHCPv6) Option for Civic Addresses Configuration Information as described at https://tools.ietf.org/html/rfc4776, the entire disclosure of which is incorporated by reference herein. In other embodiments, the instructions to determine location may include a GEOPRIV Presence Information Data Format Location Object (PIDF-LO) as described at https://tools.ietf.org/html/rfc5491, the entire disclosure of which is also incorporated by reference herein. The method 200 may include instructions to create a PIDF-LO object.

At block 204, the computer-implemented method 200 may cause a processor of the system 100 to register an instance of the desktop application (e.g., one of 120A, 1208, 120C) with the desktop application gateway 116. The method 200 may register with the gateway 116 in response to the method 200 initiating and completing a login process with the gateway 116 to create an instance of the desktop application.

At block 206, the computer-implemented method 200 may cause a processor of the system 100 to create a PIDF-LO object and to publish latitude and longitude information corresponding to the user computing device (e.g., Loc. X, Loc. Y, etc.). At block 208, the method 200 may store the location information for each instance of the desktop application in one or more registers corresponding to the applications 120A, 1208, 120C or otherwise accessible by the desktop application gateway 116.

At block 210, the computer-implemented method 200 may cause a processor of the system 100 to receive the wireless emergency alert 104 and corresponding region information 104A at the gateway 116 via the interface 114. At block 212, the method 200 may match the region information 104A to the user computing device location information (Loc. X, Loc Y). In some embodiments, the method 200 may match one or more of the PIDF-LO object and/or latitude and longitude for each instance of the desktop application to the region information 104A of the alert 104.

At block 214, the computer-implemented method 200 may cause a processor of the system 100 to send the wireless emergency alert 104 to each instance of the desktop application 120A, 120B, 120C having location information that matches the region information 104A of the wireless emergency alert 104. For example, the interface 114 may modify a format or other characteristics of the wireless emergency alert 104 so that the alert 104 may be further processed by the desktop application gateway 116 generally and a desktop alert module 118 in particular so that the alert 104 may be displayed within an interface of a desktop application executing on the network 122. In other embodiments, the cell broadcast center 106 (e.g., the interface 114) may modify the alert 104 before sending to the gateway 115. The method 200 may also include executing instructions of each instance of the desktop application 120A, 120B, 120C that receives the wireless emergency alert 104 that was modified by the interface 114 and/or the desktop alert module 118 to display the alert 104 within a user interface of the desktop application. The method 200 may also cause the radio elements 110 to broadcast the wireless emergency alert 104 to the broadcast polygon 112 matching the region information 104A.

Thus, the system 100 and method 200 described herein are directed to processing and displaying a wireless emergency alert 104 that is intended for cellular network distribution within an instance of a distributed desktop application 120A, 120B, 120C via a network. Logic in desktop applications and an IP network gateway for the desktop application may direct FEMA alerts from IPAWS to desktop applications having a connection to the gateway. A distributed application (e.g., DIGITS™, BusinessHub™ Connect, Zoom®, Skype®, etc.) with a real-time communication capability may determine a location of the user and include enhancements to display the alert by FEMA standards. The gateway for the distributed application may store the location information for each logged-in user or registered instance of the user. An interface between the MNO's cell broadcast center and the distributed application gateway may allow the gateway to receive the alert, including a region for distributing the alert, from the cell broadcast center. The gateway may then send the alert to all registered users with a location matching the alert region. The distributed application may then display the alert within an application graphical user interface of the distributed application for all users within the alert region.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled via control signals. Where multiple of such hardware modules exist contemporaneously, communications may be achieved through a signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within an environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within an environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. An apparatus for broadcasting an alert message from a cell broadcast center to a packet-switched network for display within a desktop application in communication with the packet-switched network, the system comprising:
    a gateway to a packet-switched network, the gateway including a processor and a memory storing instructions for execution by the processor for:
        receiving location information from an instance of a desktop application executing at least partially over the packet-switched network, the location information corresponding to a geographic location for a computing device executing the desktop application;
        receiving an alert message from a cell broadcast center, the alert message including a region; and
        in response to determining that the geographic location for the computing device is within the region, broadcasting the alert message to the computing device via the desktop application.

2. The system of claim 1, including further instructions for determining a location for each of the plurality of computing devices executing an instance of the desktop application.

3. The system of claim 2, including further instructions for publishing the location for each of the plurality of computing devices executing an instance of the desktop application to a register corresponding to each instance.

4. The system of claim 1, wherein the gateway is configured to facilitate communication between the plurality of computing devices executing an instance of the desktop application.

5. The system of claim 4, wherein receiving the alert message from the cell broadcast center includes receiving the alert message from the cell broadcast center at the gateway via an interface between the cell broadcast center and the gateway.

6. The system of claim 5, wherein the interface is configured to use hypertext transfer protocol (HTTP) requests including GET, PUT, POST, and DELETE for data between the cell broadcast center and the gateway.

7. The system of claim 6, wherein the interface includes one of a representational state transfer (RESTful) interface or a simple object access protocol (SOAP) interface.

8. The system of claim 1, wherein the alert message includes a Federal Emergency Management Agency (FEMA) alert.

9. The system of claim 2, wherein the instruction for determining the location for each of the plurality of computing devices executing an instance of the desktop application includes a Dynamic Host Configuration Protocol (DHCP) including one of DHCPv4 or DHCPv6.

10. The system of claim 1, wherein the location for each of the plurality of computing devices executing an instance of the desktop application includes a Presence Information Data Format Location Object (PIDF-LO).

11. The system of claim 1, wherein the gateway includes further instructions for matching the region to the location information for each of the plurality of computing devices executing an instance of the desktop application, and an integrated public alert and warning system (IPAWS) validates, formats, and forwards the alert message and its corresponding region information to the cell broadcast center.

12. A computer-implemented method for broadcasting an alert message from a cell broadcast center to a network for display within a desktop application executing over the network, the method comprising:

receiving location information from an instance of the desktop application executing over the network, the location information corresponding to a geographic location for a computing device executing the desktop application;

receiving an alert message from a cell broadcast center, the alert message including a region; and in response to determining that the geographic location for the computing device is within the region, broadcasting the alert message to the computing devices via the desktop application.

13. The computer-implemented method of claim 12, further comprising:

determining a location for each of the plurality of computing devices executing an instance of the desktop application; and publishing the location for each of the plurality of computing devices executing an instance of the desktop application to a register corresponding to each instance.

14. The computer-implemented method of claim 12, wherein a gateway is configured to facilitate communication between the plurality of computing devices executing an instance of the desktop application.

15. The computer-implemented method of claim 12, wherein receiving the alert message from the cell broadcast center includes receiving the alert message from the cell broadcast center at the gateway via an interface between the cell broadcast center and the gateway.

16. The computer-implemented method of claim 15, wherein the interface is configured to use hypertext transfer protocol (HTTP) requests including GET, PUT, POST, and DELETE for data between the cell broadcast center and the gateway.

17. The computer-implemented method of claim 16, wherein the interface includes one of a representational state transfer (RESTful) interface or a simple object access protocol (SOAP) interface.

18. The computer-implemented method of claim 12, wherein the alert message includes a Federal Emergency Management Agency (FEMA) alert.

19. The computer-implemented method of claim 12, wherein determining the location for each of the plurality of computing devices executing an instance of the desktop application includes a Dynamic Host Configuration Protocol (DHCP) including one of DHCPv4 or DHCPv6.

20. The computer-implemented method of claim 12, wherein the location for each of the plurality of computing devices executing an instance of the desktop application includes a Presence Information Data Format Location Object (PIDF-LO).

* * * * *